(12) United States Patent
Khoryaev et al.

(10) Patent No.: US 9,860,912 B2
(45) Date of Patent: Jan. 2, 2018

(54) DYNAMIC CONFIGURATION OF UPLINK (UL) AND DOWNLINK (DL) FRAME RESOURCES FOR A TIME DIVISION DUPLEX (TDD) TRANSMISSION

(71) Applicant: INTEL IP CORPORATION, Santa Clara, CA (US)

(72) Inventors: Alexey Khoryaev, Nizhny Novgorod (RU); Andrey Chervyakov, Nizhny Novgorod (RU); Mikhail Shilov, Nizhny Novgorod (RU); Jong-Kae Fwu, Sunnyvale, CA (US); Hong He, Beijing (CN)

(73) Assignee: INTEL IP CORPORATION, Santa Clara, CA (US)

(*) Notice: Subject to any disclaimer, the term of this patent is extended or adjusted under 35 U.S.C. 154(b) by 0 days.

(21) Appl. No.: 15/013,520

(22) Filed: Feb. 2, 2016

(65) Prior Publication Data
US 2016/0156454 A1 Jun. 2, 2016

Related U.S. Application Data

(63) Continuation of application No. 14/125,605, filed as application No. PCT/US2013/063793 on Oct. 18, 2013, now Pat. No. 9,282,571.

(Continued)

(51) Int. Cl.
*H04W 72/12* (2009.01)
*H04W 28/02* (2009.01)
(Continued)

(52) U.S. Cl.
CPC ........... *H04W 72/1263* (2013.01); *H04J 3/00* (2013.01); *H04L 5/0096* (2013.01); *H04L 5/22* (2013.01);
(Continued)

(58) Field of Classification Search
CPC . H04W 24/10; H04W 28/0205; H04W 72/12; H04W 72/00; H04W 28/0231;
(Continued)

(56) References Cited

U.S. PATENT DOCUMENTS

2011/0149813 A1 6/2011 Parkvall et al.
2011/0211503 A1 9/2011 Che et al.
(Continued)

FOREIGN PATENT DOCUMENTS

CN 102577209 7/2012
WO WO 2012/134107 A2 4/2012
(Continued)

OTHER PUBLICATIONS

Renesas Mobile Europe Ltd: "Discussion on Enhancements for Dynamic TDD UL-DL Configuration", 3GPP Draft; R1-122363, May 2012, 4 pages, Prague, Czech Republic.
(Continued)

*Primary Examiner* — Ashley Shivers
(74) *Attorney, Agent, or Firm* — Thorpe North & Western

(57) ABSTRACT

Technology for dynamically reconfiguring an uplink-downlink (UL-DL) time-division duplexing (TDD) configuration is disclosed. In an example, a user equipment (UE) can have computer circuitry configured to: Receive a UL-DL reconfiguration indicator from a node to dynamically reconfigure a flexible subframe (FlexSF) to a different UL-DL transmission direction from a semi-static UL-DL configuration; apply a DL channel timing based on a DL favored UL-DL configuration; and apply a UL channel timing based on a UL favored UL-DL configuration. The FlexSF can be capable of changing an UL-DL transmission direction. The DL favored UL-DL configuration can include more DL subframes than a semi-static UL-DL TDD configuration for the UE, and the UL favored UL-DL configuration includes more UL subframes than a semi-static UL-DL TDD configuration for the UE.

20 Claims, 9 Drawing Sheets

Related U.S. Application Data

(60) Provisional application No. 61/753,914, filed on Jan. 17, 2013.

(51) Int. Cl.

| | | |
|---|---|---|
| *H04J 3/00* | (2006.01) | |
| *H04L 5/22* | (2006.01) | |
| *H04W 16/32* | (2009.01) | |
| *H04W 48/16* | (2009.01) | |
| *H04W 56/00* | (2009.01) | |
| *H04W 52/02* | (2009.01) | |
| *H04W 12/04* | (2009.01) | |
| *H04W 76/02* | (2009.01) | |
| *H04W 24/02* | (2009.01) | |
| *H04W 72/04* | (2009.01) | |
| *H04W 76/04* | (2009.01) | |
| *H04W 24/10* | (2009.01) | |
| *H04W 88/06* | (2009.01) | |
| *H04W 36/00* | (2009.01) | |
| *H04W 48/10* | (2009.01) | |
| *H04W 84/12* | (2009.01) | |
| *H04L 5/00* | (2006.01) | |

(52) U.S. Cl.
CPC .......... *H04W 12/04* (2013.01); *H04W 16/32* (2013.01); *H04W 24/02* (2013.01); *H04W 24/10* (2013.01); *H04W 28/0231* (2013.01); *H04W 36/0066* (2013.01); *H04W 48/10* (2013.01); *H04W 48/16* (2013.01); *H04W 52/0251* (2013.01); *H04W 56/001* (2013.01); *H04W 72/0413* (2013.01); *H04W 72/12* (2013.01); *H04W 72/1278* (2013.01); *H04W 76/021* (2013.01); *H04W 76/046* (2013.01); *H04W 88/06* (2013.01); *H04L 5/0092* (2013.01); *H04L 5/0094* (2013.01); *H04L 2209/80* (2013.01); *H04W 84/12* (2013.01); *Y02B 60/50* (2013.01)

(58) Field of Classification Search
CPC ......... H04W 28/0252; H04W 72/1205; H04W 72/1263; H04W 72/1278; H04W 74/00; H04L 5/22; H04J 3/00; H04J 14/08; H04B 7/212
See application file for complete search history.

(56) References Cited

U.S. PATENT DOCUMENTS

| | | | |
|---|---|---|---|
| 2012/0230232 A1 | 9/2012 | Ji et al. | |
| 2012/0300681 A1* | 11/2012 | Ji | H04W 56/00 370/280 |
| 2013/0044652 A1* | 2/2013 | Wang | H04L 1/08 370/280 |
| 2013/0194980 A1* | 8/2013 | Yin | H04L 1/1854 370/280 |
| 2013/0301570 A1* | 11/2013 | Xu | H04L 5/0073 370/329 |
| 2014/0050125 A1* | 2/2014 | Zhang | H04J 3/1694 370/280 |
| 2014/0086112 A1* | 3/2014 | Stern-Berkowitz | H04W 72/1289 370/280 |
| 2014/0146696 A1* | 5/2014 | Lin | H04W 72/12 370/252 |
| 2014/0161001 A1* | 6/2014 | Gao | H04W 72/0446 370/280 |
| 2015/0036519 A1* | 2/2015 | Kazmi | H04L 5/00 370/252 |
| 2015/0282036 A1* | 10/2015 | Yi | H04L 5/001 370/332 |
| 2015/0333877 A1* | 11/2015 | Rahman | H04W 72/082 370/280 |

FOREIGN PATENT DOCUMENTS

| | | |
|---|---|---|
| WO | WO 2012/113131 A1 | 8/2012 |
| WO | WO 2012/124924 A2 | 9/2012 |
| WO | WO 2012/130158 A1 | 10/2012 |
| WO | WO 2013/112372 A1 | 8/2013 |

OTHER PUBLICATIONS

Zukang Shen et al: "Dynamic uplink-downlink configuration and interference management in TD-LTE", IEEE Communications Magazine, IEEE Service Center, Piscataway, US, vol. 50, No. 11, Nov. 1, 2012 (Nov. 1, 2012), pp. 51-59.
Alcatel-Lucent, "Discussion on HARQ timing with dynamic TDD UL-DL configuration", R1-120513, 3GPP TSG RAN WG1 Meeting #68, Dresden, Germany, Feb. 6-10, 2012, pp. 1-3.
Alcatel-Lucent, "Discussion on Timing Issues with Dynamic TDD UL-DL Configuration", R1-122510, 3GPP TSG RAN WG1 Meeting #69, Prague, Czech Republic, May 21-25, 2012, pp. 1-8.
He, et al, "A Dynamic Radio Resource Allocation of TDD System", Disclosure# 90469, Jan. 17, 2012, 10 Pages.
He, et al, "A Novel Method and Apparatus for UL-DL Re-configuration Indication of TDD System", Disclosure# 90397, Jan. 11, 2012, 10 Pages.
He, et al, "A Novel Scheduling/HARQ Timing Indication Method for UL-DL Reconfiguration", Disclosure# 93695, May 11, 2012, 15 Pages.
International Search Report and Written Opinion received for PCT Patent Application No. PCTUS2013/063793, dated Jan. 28, 2014, 16 Pages.
Samsung, "Dynamic Reconfiguration of TDD UL-DL Configuration", R1-122267, 3GPP TSG RAN WG1 Meeting #69, Prague, Czech Republic, May 21-25, 2012, pp. 1-2.
Samsung, "Evaluation of TDD dynamic reconfiguration in multi-cell pico scenario", R1-121655, 3GPP TSG RAN WG1 #68bis, Jeju, Korea, Mar. 26-30, 2012, pp. 1-4.
Samsung, "Semi-Static Reconfiguration of TDD UL-DL Configuration", R1-122266, 3GPP TSG RAN WG1 Meeting #69, Prague, Czech Republic, May 21-25, 2012, pp. 1-2.

\* cited by examiner

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | - | 4 | - | - | 6 | - | 4 |
| 1 | - | - | 7, 6 | 4 | - | - | - | 7, 6 | 4 | - |
| 2 | - | - | 8, 7, 4, 6 | - | - | - | - | 8, 7, 4, 6 | - | - |
| 3 | - | - | 7, 6, 11 | 6, 5 | 5, 4 | - | - | - | - | - |
| 4 | - | - | 12, 8, 7, 11 | 6, 5, 4, 7 | - | - | - | - | - | - |
| 5 | - | - | 13, 12, 9, 8, 7, 5, 4, 11, 6 | - | - | - | - | - | - | - |
| 6 | - | - | 7 | 7 | 5 | - | - | 7 | 7 | - |

DYNAMIC CONFIGURATION OF UPLINK (UL) AND DOWNLINK (DL) FRAME RESOURCES FOR A TIME DIVISION DUPLEX (TDD) TRANSMISSION

RELATED APPLICATIONS

This application is a continuation of U.S. patent application Ser. No. 14/125,605 filed Dec. 12, 2013 which claims the benefit of U.S. Provisional Patent Application Ser. No. 61/753,914, filed Jan. 17, 2013, both of which are hereby incorporated in their entirety by reference.

BACKGROUND

Wireless mobile communication technology uses various standards and protocols to transmit data between a node (e.g., a transmission station or a transceiver node) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) can be used to handle the increased traffic loads on the macro nodes due to increased density of the cells deployed. HetNets can include a layer of planned high power macro nodes (or macro-eNBs) overlaid with layers of lower power nodes (small-eNBs, micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes", small nodes, or small cells.

The macro node can be used for basic coverage. The low power nodes can be used to fill coverage holes, to improve capacity in hot-zones or at the boundaries between the macro nodes' coverage areas, and improve indoor coverage where building structures impede signal transmission. Inter-cell interference coordination (ICIC) or enhanced ICIC (eICIC) may be used for resource coordination to reduce interference between the nodes, such as macro nodes and low power nodes in a HetNet.

Homogeneous networks or HetNets can use time-division duplexing (TDD) or frequency-division duplexing (FDD) for DL or UL transmissions. Time-division duplexing (TDD) is an application of time-division multiplexing (TDM) to separate downlink and uplink signals. In TDD, downlink signals and uplink signals may be carried on a same carrier frequency where the downlink signals use a different time interval from the uplink signals, so the downlink signals and the uplink signals do not generate interference for each other. TDM is a type of digital multiplexing in which two or more bit streams or signals, such as a downlink or uplink, are transferred apparently simultaneously as sub-channels in one communication channel, but are physically transmitted on different time resources. In frequency-division duplexing (FDD), an uplink transmission and a downlink transmission can operate using different frequency carriers. In FDD, DL-UL interference can be avoided because the downlink signals use a different frequency carrier from the uplink signals.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
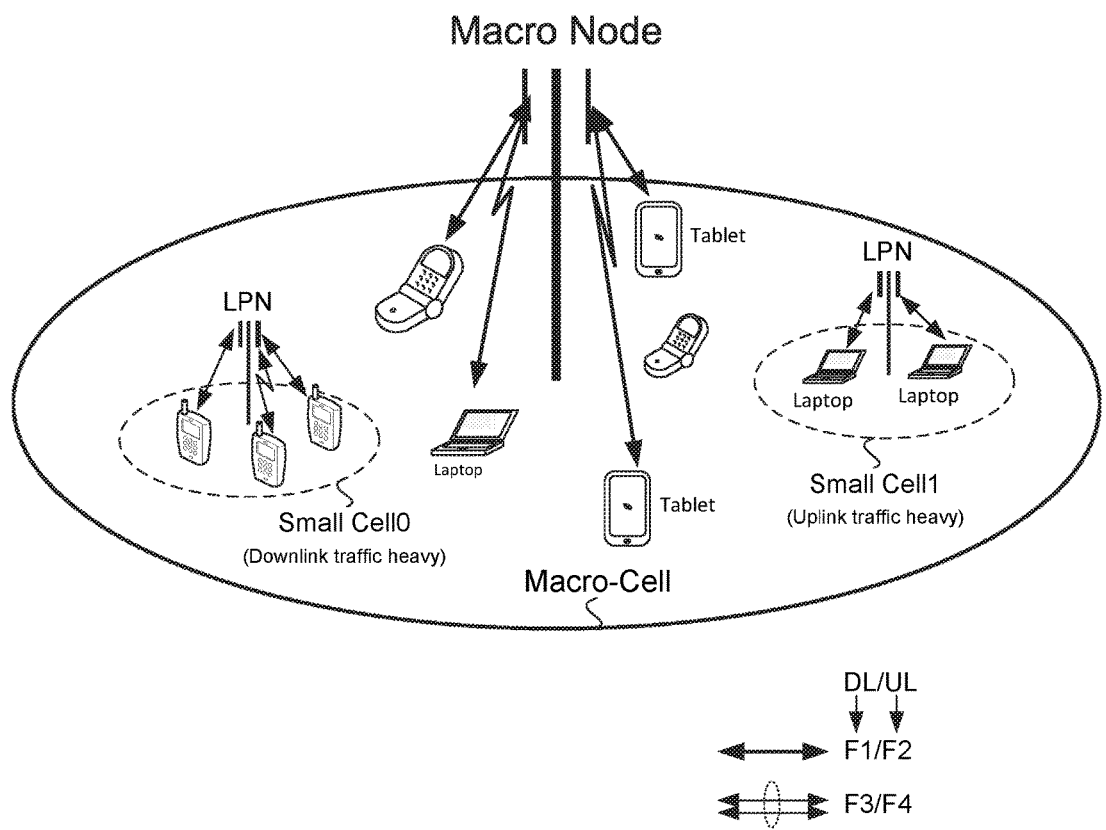
FIG. 1 illustrates a diagram of dynamic uplink-downlink (UL-DL) reconfiguration usage in a time-division duplexing (TDD) system in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Time division duplex (TDD) can offer flexible deployments without using a pair of spectrum resources. For TDD deployments, interference between uplink (UL) and downlink (DL) transmission including both base station-to-base station (BS-to-BS) interference and UE-to-UE interference can be considered when different uplink-downlink (UL-DL) configurations are used among cells in a network.

FIG. 1 illustrates a layered HetNet deployment with different node transmission powers using time-division duplexing (TDD). A node transmission power can refer to the power generated by a node type, such as a macro node (e.g., macro evolved Node B (eNB)) in a macro cell and multiple low power nodes (LPNs or small eNBs) in the respective small cells. As used herein, a cell can refer to the node or the coverage area of the node. The macro nodes can transmit at high power level, for example, approximately 5 watts (W) to 40 W, to cover the macro cell. The HetNet can be overlaid with low power nodes (LPNs), which may transmit at substantially lower power levels, such as approximately 100 milliwatts (mW) to 2 W. In an example, an available transmission power of the macro node may be at least ten times an available transmission power of the low power node. A LPN can be used in hot spots or hot-zones, referring to areas with a high wireless traffic load or high volume of actively transmitting wireless devices (e.g., user equipments (UEs)). A LPN can be used in a microcell, a picocell, a femtocell, and/or home network. Small Cell0 illustrates downlink traffic heavy usage by the wireless devices (e.g., UEs) and Small Cell1 illustrates uplink traffic heavy usage by the wireless devices. In a FDD example, the macro cell can use frequency bands F1 for DL and F2 for UL, and small cells can use frequency bands F3 for DL and F4 for UL. In a TDD example, frequency band F1 (or F2) can be used for DL and UL by the macro cell and frequency bands F3/F4 can be used for DL and UL by the small cells. In another example, the macro cell and small cells can use the same frequency band F1, F2, F3, or F4

Allowing adaptive UL-DL configurations depending on traffic conditions in different cells can significantly improve the system performance in some examples. FIG. 1 illustrates an example where different UL-DL configurations can be considered in different cells. Networks (e.g., HetNets or homogeneous networks) can involve a same carrier or different carriers deployed by a single operator or different operators in the same band and employing either a same or different uplink-downlink (UL-DL) configurations. Different UL-DL configurations can be used in different cells of the network (e.g., HetNet), and different carriers deployed by different operators in the same band can be used employing either the same or different uplink-downlink configurations. Interference may include adjacent channel interference (when different carrier frequencies are used) as well as co-channel interference (when a same carrier frequency is used) such as remote node-to-node interference (or BS-to-BS interference or eNB-to-eNB interference).

Various radio access technologies (RAT), such as legacy LTE TDD Release 8, 9, 10, or 11 and advance LTE TDD Release 12, can support asymmetric UL-DL allocations by providing seven different semi-statically configured uplink-downlink configurations (i.e., legacy UL-DL TDD configurations). A legacy UL-DL TDD configurations can refer to a UL-DL TDD configurations as described in LTE TDD Release 8, 9, 10, or 11. Table 1 illustrates seven UL-DL configurations used in LTE, where "D" represents a downlink subframe, "S" represents a special subframe, and "U" represents an uplink subframe. In an example, the special subframe can operate or be treated as a downlink subframe.

TABLE 1

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

As illustrated by Table 1, UL-DL configuration 0 can include 6 uplink subframes in subframes 2, 3, 4, 7, 8, and 9, and 4 downlink and special subframes in subframes 0, 1, 5, and 6; and UL-DL configuration 5 can include one uplink subframe in subframe 2, and 9 downlink and special subframes in subframes 0, 1, 3-9.

The legacy LTE UL-DL TDD set of configurations can provide DL subframes allocations in the range of 40% to 90%, and UL subframes allocations in the range of 10% to 60%, as shown in Table 1. A semi-static allocation, at any given time, may not match the instantaneous traffic situation. A mechanism for adapting UL-DL allocation can be based on a system information change procedure, where the UL and DL subframes allocation within a radio frame can be reconfigured through system information broadcast signaling (e.g., a system information block 1 [SIB1]). Hence, the UL-DL allocation once configured can be expected to vary semi-statically. With a mechanism based on the SIB1, a minimum latency of approximately 640 milliseconds (ms) can be used for the reconfiguration.

Thus, a legacy LTE network may not adapt to a UL-DL configuration based on cell specific instantaneous traffic needs. The semi-static configuration of the DL and UL frame resources across the whole network may not allow adjusting an amount of the DL and UL resources based on instantaneous traffic needs. The inability to adjust the DL and UL resources based on instantaneous traffic situations may create restriction in small cells deployed in a macro cell coverage area, since traffic condition in small cells may vary substantially. Dynamic allocation of the number of the DL and UL frame resources can boost performance of LTE small cells networks operating in the TDD spectrum.

Figures 2, 3:
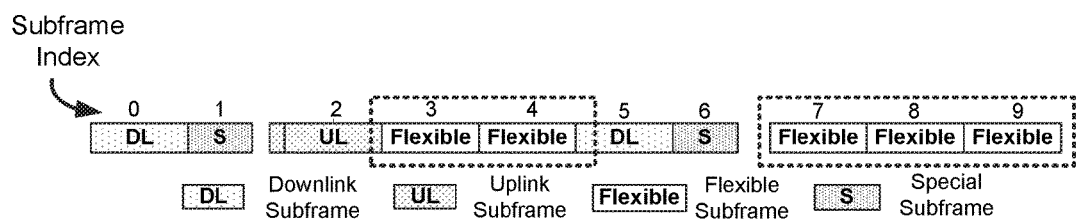
FIG. 2 illustrates a diagram of a legacy long term evolution (LTE) frame structure 2 (FS2) with flexible subframe (FlexSF) in accordance with an example.
FIG. 3 illustrates a table (Table 2) for hybrid automatic repeat request (HARQ) timing for a set of a legacy long term evolution (LTE) uplink-downlink (UL-DL) time-division duplexing (TDD) configurations in accordance with an example.
Figure 4:
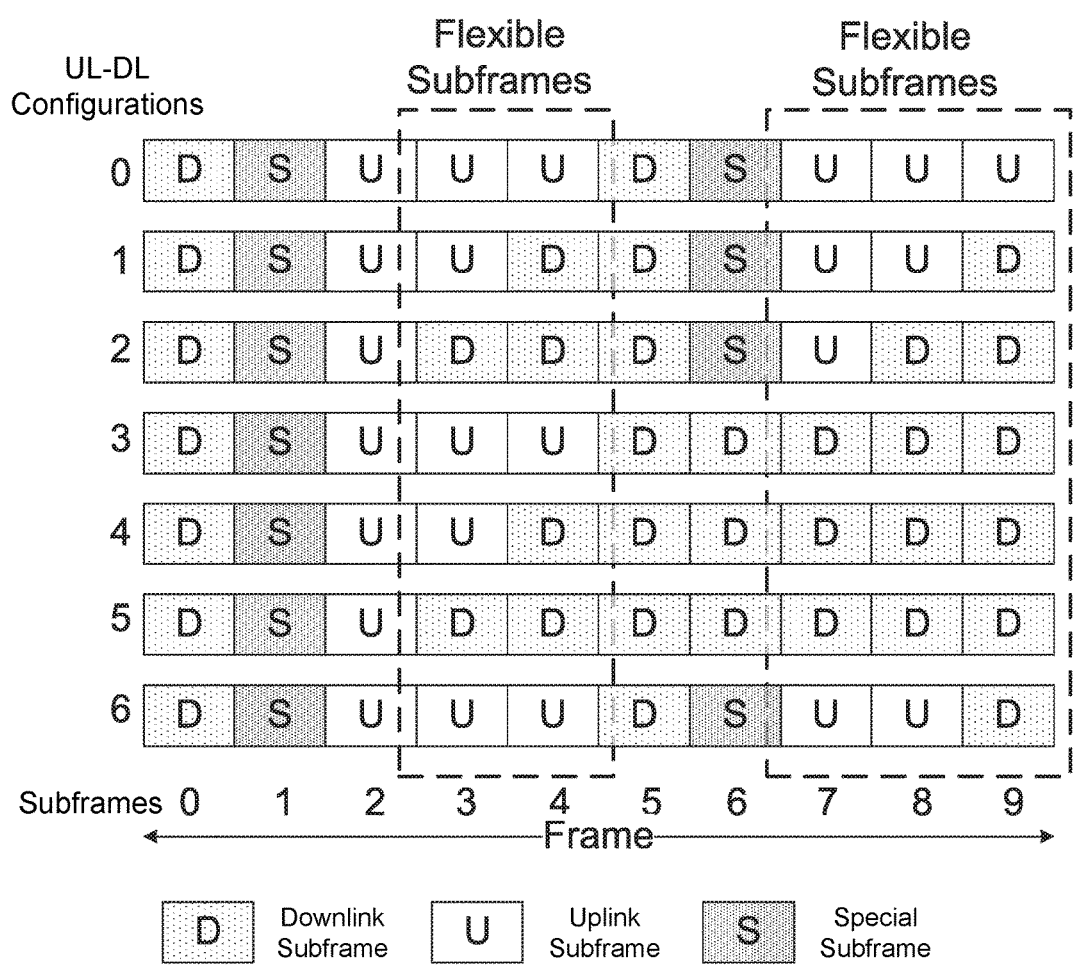
FIG. 4 illustrates a diagram of flexible subframes (FlexSFs) in a set of legacy long term evolution (LTE) uplink-downlink (UL-DL) time-division duplexing (TDD) configurations in accordance with an example.

For instance, mechanisms can be used to support dynamic allocation of UL and DL subframes with a lower latency (e.g., 10 ms), such as "Flexible Subframes" (FlexSF), as shown in FIG. 2. A flexible subframe is capable of changing an uplink-downlink transmission direction for a set of legacy UL-DL TDD configurations. For example, subframes with a subframe index 3, 4, 7, 8, and 9 can vary between UL or DL subframes in the seven different semi-statically configured legacy LTE UL-DL TDD configurations (FIG. 4). Subframes 0, 1, 2, 5, and 6 can be referred to as fixed subframes since the transmission direction can be fixed as primarily an UL subframe (e.g., subframe 2) or a DL subframe (e.g., DL subframes 0 and 5, special subframe 1, or DL or special subframe 6) for the seven different semi-statically configured legacy LTE UL-DL TDD configurations.

The technology (e.g., methods, computer circuitry, nodes, configuration devices, processors, transceivers, or UEs) described herein can enable dynamic change of subframe types (e.g., UL or DL) in the legacy UL-DL configuration and signaling mechanisms to support dynamic allocation of DL and UL resources in the LTE physical frame structure. The technology can be compatible with a legacy LTE network (i.e., LTE Release 8, 9, 10, or 11) and can have minimal impact on legacy terminals (e.g., UEs), and can provide lower implementation complexity for the dynamic change. The technology can provide a fast adaptation time scale (e.g., 10 ms) for dynamic reconfiguration of DL and UL frame resources in LTE TDD small cells.

Advanced UEs (e.g., UEs supporting LTE Release 12 features) supporting UL-DL TDD reconfiguration, can dynamically reconfigure the semi-statically configured legacy LTE UL-DL TDD configurations to another configuration by configuring the FlexSF to a different transmission direction (e.g., UL to DL, or DL to UL). The FlexSFs can be transparent to legacy UEs, using LTE TDD Release 8, 9, 10 or 11, and the UL or DL configuration of the FlexSFs can be changed semi-statically for legacy UEs through system information block type 1 (SIB1) information bits. The node can be responsible for properly schedule the data transmission of legacy UEs to ensure that the corresponding physical uplink shared channel (PUSCH) and hybrid automatic repeat request-acknowledgement (HARQ-ACK) resources of the physical downlink shared channel (PDSCH) and the PUSCH still are valid even when the TDD configuration is changed for an advanced UE supporting FlexSFs.

A downlink signal or channel can include data on a Physical Downlink Shared CHannel (PDSCH) or control information on a Physical Downlink Control CHannel (PDCCH). A PDCCH (or enhanced PDCCH) can carry a message known as Downlink Control Information (DCI), which can includes transmission resource assignments, such as a PDSCH or PUSCH, and other control information for a UE or group of UEs. Many PDCCHs can be transmitted in a subframe. An uplink signal or channel can include data on a Physical Uplink Shared CHannel (PUSCH) or control information on a Physical Uplink Control CHannel (PUCCH). Automatic Repeat reQuest is a feedback mechanism whereby a receiving terminal requests retransmission of packets which are detected to be erroneous. Hybrid ARQ is a simultaneous combination of Automatic Retransmission reQuest (ARQ) and forward error correction (FEC). When HARQ is used and if the errors can be corrected by FEC then no whole retransmission may be requested, otherwise if the errors can be detected but not corrected, a whole retransmission can be requested. An ACKnowledgment (ACK) signal can be transmitted to indicate that one or more blocks of data, such as in a PDSCH, have been successfully received and decoded. HARQ-ACK/Negative ACKnowledgment (NACK or NAK) information can include feedback from a receiver to the transmitter in order to acknowledge a correct reception of a packet or ask for a new retransmission (via NACK or NAK). A PDSCH HARQ can be transmitted in an uplink subframe after a PDSCH in a downlink subframe, and a PUSCH HARQ can be transmitted in a downlink subframe after a PUSCH in an uplink subframe. In a legacy system, the timing relation between the DL/UL grant, the DL/UL data allocation, and the DL/UL HARQ feedbacks may be predetermined.

In legacy LTE, each of the seven semi-statically configured UL-DL TDD configurations can have PDSCH HARQ timings corresponding to UL subframes, and PUSCH scheduling timings and PUSCH HARQ timings corresponding to DL subframes. For example, Table 2 illustrates the PDSCH HARQ timing for seven UL-DL configurations used in LTE, as illustrated in FIG. 3. A PDSCH transmission can be indicated by the detection of corresponding PDCCH or a PDCCH indicating downlink SPS release within subframe(s) n−k, where k∈K and K defined in Table 2 (also shown in Table 10.1.3.1-1 3GPP technical specification (TS) 36.213 V11.0.0 (2012 September)) is a set of M elements $\{k_0, k_1, \ldots k_{M-1}\}$ depending on the subframe n. For instance, an uplink subframe n in Table 2 can be used to transmit PDSCH HARQ-ACK(s) for PDSCH in subframe(s) n−k.

For example, in TDD configuration 1 indicated by the SIB1, a UL subframe 2 can provide a PDSCH HARQ-ACK for DL subframes 5 and 6 of a prior radio frame, a UL subframe 3 can provide a PDSCH HARQ-ACK for DL subframe 9 of the prior frame, UL subframe 7 can provide a PDSCH HARQ-ACK for DL subframes 0 and 1 of the prior frame, and UL subframe 8 can provide a PDSCH HARQ-ACK for DL subframe 4 of the prior frame. In an example, at least four subframes may occur between a downlink subframe and an uplink subframe to allow for transmission, decoding, and processing of the downlink transmission, PDCCH, and/or uplink transmission.

Table 3 illustrates the PUSCH scheduling timing for seven UL-DL configurations used in LTE. For UL-reference UL/DL configurations belonging to {1, 2, 3, 4, 5, 6} and a normal HARQ operation, the UE can upon detection of a PDCCH or enhanced physical downlink control channels (EPDCCH or ePDCCH) with an uplink DCI format and/or a physical hybrid automatic repeat request (ARQ) indicator channel (PHICH) transmission in subframe n intended for the UE, adjust a corresponding PUSCH transmission in subframe n+k, with k given in Table 3 (also shown in Table 8-2 3GPP technical specification (TS) 36.213 V11.0.0 (2012 September)), according to the PDCCH/EPDCCH information and the PHICH information. Physical Hybrid ARQ Indicator CHannel (PHICH) is a downlink physical channel which carries the HARQ ACK/NACK information indicating whether the node has correctly received a transmission on the PUSCH. For UL-reference UL/DL configuration 0 and normal HARQ operation, a least significant bit (LSB) of the UL index in the DCI format 0/4 can be set to 1 in subframe n or a PHICH can be received in subframe n=0 or 5 in the resource corresponding to $I_{PHICH}=1$, or PHICH can be received in subframe n=1 or 6, the UE can adjust the corresponding PUSCH transmission in subframe n+7.

TABLE 3

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | 4 |
| 3 | 4 | | | | | | | 4 | 4 | |
| 4 | | | | | | | | | 4 | 4 |
| 5 | | | | | | | | | 4 | |
| 6 | 7 | 7 | | | | 7 | 7 | | | 5 |

For example in TDD configuration 1 indicated by the SIB1, a DL subframe 1 can schedule a PUSCH in a UL subframe 7, a DL subframe 4 can schedule a PUSCH in a UL subframe 8, a DL subframe 6 can schedule a PUSCH in a UL subframe 2 of a subsequent radio frame, and a DL subframe 9 can schedule a PUSCH in UL subframe 3 of a subsequent frame. In an example, at least four subframes may occur between a downlink subframe and an uplink subframe to allow for transmission, decoding, and processing of the downlink transmission, PDCCH, and/or uplink transmission.

Table 4 illustrates the PUSCH HARQ timing for seven UL-DL configurations used in LTE. For PUSCH transmissions scheduled from serving cell c in subframe n, a UE can determine the corresponding PHICH resource of a serving cell c in subframe $n+k_{PHICH}$ where $k_{PHICH}$ is given in Table 4 (also shown in Table 9.1.2-1 3GPP technical specification (TS) 36.213 V11.0.0 (2012 September)).

TABLE 4

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

For example in TDD configuration 0 indicated by the SIB1, a PUSCH HARQ-ACK for a UL subframe 2 can be transmitted in a DL subframe 6, a PUSCH HARQ-ACK for a UL subframe 3 can be transmitted in a DL subframe 9, a PUSCH HARQ-ACK for a UL subframe 7 can be transmitted in a DL subframe 1 of a subsequent radio frame, and a PUSCH HARQ-ACK for a UL subframe 8 can be transmitted in a DL subframe 4 of a subsequent frame. In an example, at least four subframes may occur between an uplink subframe and a downlink subframe to allow for decoding and processing of the downlink transmission, uplink transmission, and/or PHICH.

The dynamic reconfiguration technology (e.g., methods, computer circuitry, nodes, configuration devices, processors, transceivers, or UEs) described herein can provide a dynamic reconfiguration of UL-DL TDD configurations with minimum changes to the UE terminal and to the LTE specification while preserving full flexibility in terms of traffic adaptation capabilities. In addition, the technology may not add new physical (PHY) layer signaling or change PHY layer signaling to support fast adaptation time scale in the order of 10 ms.

In an example, the technology may use existing legacy LTE UL-DL configurations without adding new UL-DL configurations. Legacy UEs (e.g. LTE Release 8-11 UEs) can operate using semi-static UL-DL configuration broadcasted in SIB1, so the dynamic reconfiguration has minimal to no impact on legacy UE behavior. The dynamic reconfiguration technology can support a fast adaptation time scale for advanced UEs (e.g., LTE Release 12 UEs) without the introduction of additional physical layer signaling and without changes in the LTE PHY physical structure. The dynamic reconfiguration technology can reuse HARQ operation timelines defined for legacy UEs and preserve flexible traffic adaptation capabilities in small cells.

The dynamic reconfiguration technology can utilize the flexible subframe (FlexSF) mechanism, as illustrated by FIG. 4. In LTE TDD systems with dynamic UL-DL reconfiguration, the subframes may be classified in accordance with their possibility to change the transmission directions between legacy LTE UL-DL configurations. For example, subframes 0, 1, 5, and 6 for the 7 legacy LTE UL-DL configurations can be classified as regular (or static) DL subframes (i.e., including DL and special subframes) because these subframes may not change from the DL transmission direction. Subframe 2 for the 7 legacy LTE UL-DL configurations can be classified as a regular or static UL subframe because subframe 2 may not change from the UL transmission direction. Subframes 3, 4, 7, 8, and 9 for the 7 legacy LTE UL-DL configurations can be classified as flexible because these subframes can be configured as a DL subframe or an UL subframe (i.e., changed transmission direction from DL to UL or UL to DL for the 7 legacy LTE UL-DL configurations) depending on the legacy LTE UL-DL configuration. For example, subframe 3 can be configured as an UL subframe for LTE UL-DL configurations 0, 1, 3, 4, and 6, or configured as a DL subframe for LTE UL-DL configurations 2 and 5. FIG. 4 illustrates the transmission directions of the flexible subframes for the 7 legacy LTE UL-DL configurations (i.e., LTE UL-DL configuration 0-6).

In another example, the transmission direction of flexible subframes configured as UL (i.e., subframes 3, 7, and 8) by UL-DL configuration 1 in the SIB1 may be changed to DL for advanced UEs. The dynamic reconfiguration of advanced UEs can imply compliant operation of legacy UEs, since if the legacy UEs are not scheduled or configured for transmission of the UL signal, the legacy UEs can just skip the UL subframe. In addition, the dynamic reconfiguration of advanced UEs may not have an impact on the traffic adaptation characteristics, if a serving cell is configured with a UL favored UL-DL configuration (e.g., UL-DL configuration 0), since each flexible subframe can dynamically change transmission direction from UL to DL and back to UL, as illustrated in FIG. 1.

By default, UEs in the network may follow the legacy behavior in accordance with the UL-DL configuration broadcasted in the SIB1. If the network determines that dynamic resource allocations (e.g. traffic asymmetry) can improve traffic conditions, the network (e.g., via the eNB) can configure served advanced UEs to operate in dynamic mode that supports reconfiguration of the subframe type. Higher layer signaling (e.g., radio resource control (RRC) signaling) or physical layer signaling can be used to activate a dynamic UL-DL configuration mode for the advanced UEs linked to the cell (e.g., using cell-specific mechanism). Activation of a dynamic UL-DL configuration mode for the advanced UEs can be performed in UE-specific way so that each advanced UE may be independently configured to start operation in dynamic UL-DL reconfiguration mode. The dynamic UL-DL configuration mode can be activated using a UL-DL reconfiguration indicator. For instance, the DCI (e.g., a DL DCI grant or an UL DCI grant) or RRC signaling can carry the UL-DL reconfiguration indicator and can be used to activate the dynamic UL-DL reconfiguration mode in a UE specific way. The activation of the dynamic UL-DL reconfiguration mode can be acknowledged by the eNB so that no ambiguity exists between the eNB and UE in terms of UL/DL operation in subsequent subframes. ACK/NACK signaling can be used for dynamic UL-DL reconfiguration mode acknowledgements. A legacy UE may not provide an ACK or may not have capability to provide an ACK.

Figure 5:
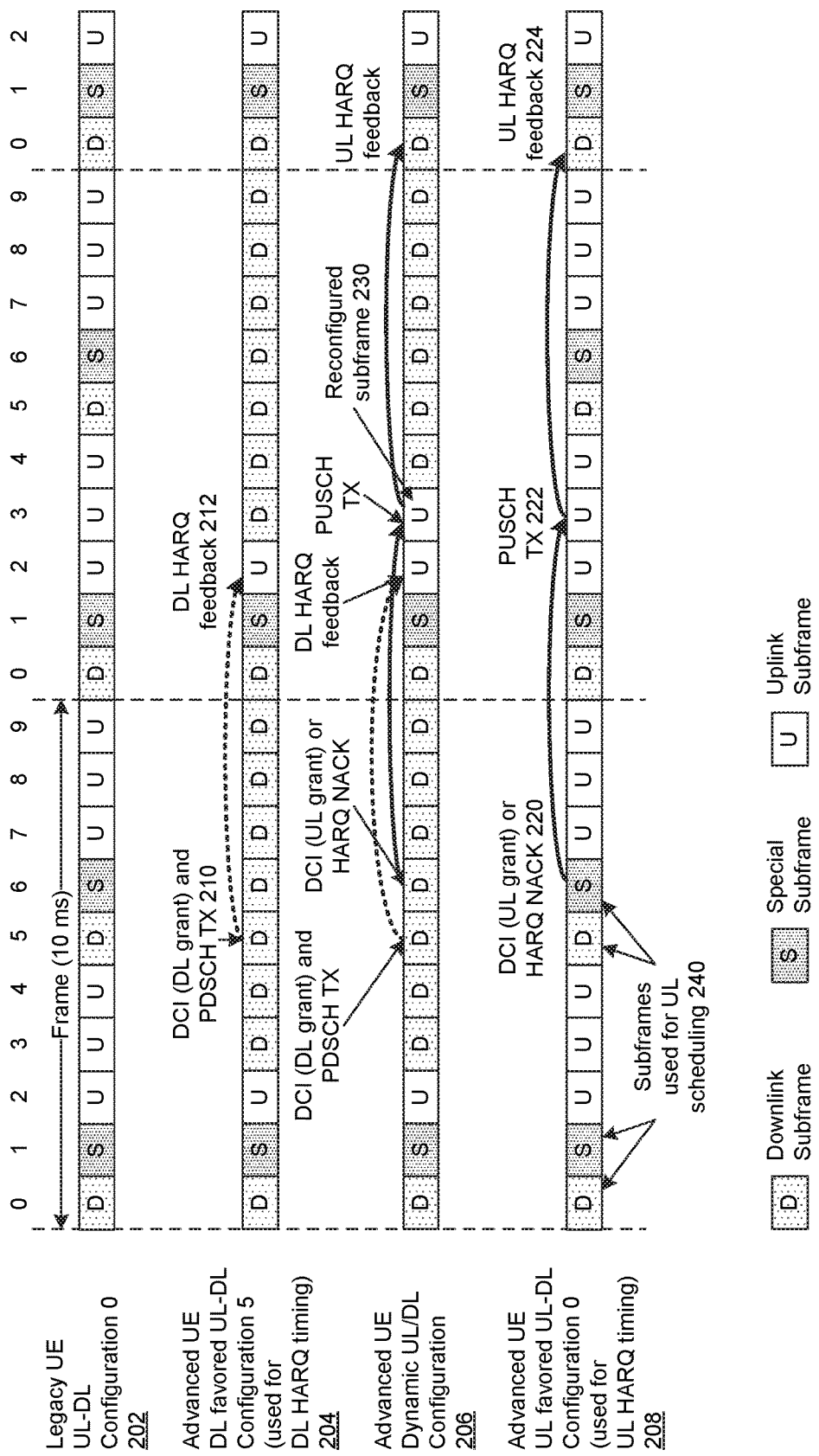
FIG. 5 illustrates a diagram of hybrid automatic repeat request (HARQ) operation for a user equipment (UE) with dynamic uplink-downlink (UL-DL) reconfigurations in accordance with an example.

A default number of DL subframes for a radio frame can be controlled by a UL-DL configuration broadcasted in SIB1. The dynamic UL-DL reconfiguration technology can provide a mechanism for determining which subframes can be treated or used as additional DL subframes for advanced UEs with dynamic UL-DL reconfiguration capabilities. In an example, the UL-DL reconfiguration indicator can indicate the set of additional flexible subframes to be configured as DL subframes using an existing set of UL-DL reconfigurations. For instance, UL favored UL-DL configuration 0 can be configured by RRC signaling or the UL favored UL-DL configuration 0 can be set via the SIB1 or associated with UL-DL configuration broadcasted by SIB1, as illustrated in FIG. 5. The DL favored UL-DL configuration 5 can also be configured by RRC signaling. The UL-DL reconfiguration indicator can configure subframes 4, 7, 8, and 9 as DL subframes (e.g., switching transmission direction from UL to DL), which can dynamically change the radio frame from the legacy LTE UL-DL configuration 0 to the legacy LTE UL-DL configuration 4 (206), where subframe 3 is reconfigured 230 from the DL favored UL-DL configuration. In another configuration, the DL favored UL-DL configuration 5 along with the UL-DL reconfiguration indicator can configure subframe 3 as a UL subframe (e.g., switching transmission direction from DL to UL), which can dynamically change the radio frame from the DL favored UL-DL configuration 5 (204) to the legacy LTE UL-DL configuration 4 (206). In another example, the UL-DL reconfiguration indicator may not configure subframe 3 as a DL subframe while leaving subframe 4 as an UL subframe, since the UL-DL configuration does not correspond to one of the 7 legacy LTE UL-DL configurations. The UL-DL reconfiguration indicator can be used to dynamically configure the advanced UE from one legacy LTE UL-DL configuration to another legacy LTE UL-DL configuration without a change in the SIB1.

In another example, the network may use the existing set of legacy LTE UL-DL configurations and instruct the advanced UE to use a DL-favored UL-DL configuration with a specified number of DL subframes (e.g., legacy LTE UL-DL configuration 5 (204) in FIG. 5). The DL-favored UL-DL configuration may be signaled in a semi-static way (e.g., RRC signaling) and updated non-frequently. Once the advanced UE has been configured with the additional DL-favored UL-DL configuration by eNB, the advanced UE can assume that the additional set of DL flexible subframes is available for future operations. Thus, the advanced UEs may start to monitor these flexible subframes for DL grants and allocations of data transmission. Thus, the UL-favored UL-DL configuration and DL-favored UL-DL configuration can provide the bounds on the number of flexible subframes to monitor for DL grants and allocations of data transmission. For instance, as illustrated in FIG. 5, the UL-favored UL-DL configuration can be the legacy LTE UL-DL configuration 0 208 and the DL-favored UL-DL configuration can be the legacy LTE UL-DL configuration 5 (204), so all 7 legacy LTE UL-DL configurations can be available for dynamic reconfiguration, and the advanced UE may monitor subframes 3, 4, 7, 8, and 9 for DL grants and allocations of data transmission. In another example, the UL-favored UL-DL configuration can be the legacy LTE UL-DL configuration 6 and the DL-favored UL-DL configuration can be the legacy LTE UL-DL configuration 2, so 3 legacy LTE UL-DL configurations (i.e., legacy LTE UL-DL configurations 1, 2, and 6) can be available for dynamic reconfiguration, and the advanced UE may monitor subframes 3, 4, and 8 for DL grants and allocations of data transmission. Configuring the UL-favored UL-DL configuration and the DL-favored UL-DL configuration can provide reservation of the "DL flexible subframes".

A dynamic change of "DL flexible subframes" to UL subframes may use various scheduling mechanisms. The DL DCI grants can schedule DL data allocation for the subframes where DL grants are transmitted. Thus, if the eNB determines to use a legacy UL subframe for the DL data transmission to one of its advanced 12 UEs configured in dynamic operation mode, the eNB can just schedule DL grant in one of the monitored "DL flexible subframes" (e.g., send a downlink DCI grant).

If the eNB determines to use the "DL flexible subframe" as an UL subframe, at least two options are available. In an option, the eNB can use existing DCI messages and allocate a UL grant in one of the preceding subframes 240 to schedule the UL transmissions in one of the "DL flexible subframes". For legacy UEs, the "DL flexible subframes" can be interpreted as UL subframes, as illustrated by legacy LTE UL-DL configuration 0 (202) in FIG. 5. For legacy and advanced UEs, the eNB may use preceding DL subframes for scheduling the UL grant. Thus, the eNB may use the same subframes to allocate UL grant for advanced UE configured in dynamic mode or legacy UEs. If an allocated UL grant points to one of the "DL flexible subframe" then the UE can interpret the flexible subframe as a UL subframe and prepare data for future transmission at the flexible subframe. An advantage of using existing DCI messages is that UL grants for dynamic mode may not have any changes in the existing DCI messages and may also be implemented using existing legacy HARQ timelines.

In another option, a new DCI message (e.g., including a UL-DL reconfiguration indicator) may be introduced to indicate that particular DL subframe can be interpreted as a UL and used for UL transmission. Using a new DCI message (e.g., different DCI message type) may define a new HARQ timeline. This DCI message may carry UL-DL configuration to be applied in the current or the next frame and may be carried out in one of the static DL subframes. This new UL-DL configuration can be a subset of legacy UL-DL configurations and may have less number of DL subframes compared to the configured DL-favored UL-DL configuration.

The LTE HARQ timing (or HARQ timeline) can assume asynchronous operation in a DL data transmission and synchronous operation in a UL data transmission. For instance, a fixed time may exist between a DL scheduling grant and UL HARQ feedback (i.e., DL data transmission); however no strict timing relationship may exist for a DL retransmission of data. For uplink operation (i.e., UL data transmission), the allocation of a UL grant, a UL transmission, and DL HARQ feedback can be determined by strict timing relationships which can depend on the UL-DL configuration broadcasted in SIB1.

For network systems with dynamic assignment of UL and DL resources, the legacy HARQ timelines may be modified, since the subframes may dynamically change transmission direction. Generating new HARQ timelines can introduce additional complexity at the UE terminal and eNodeB sides. Configuring a terminal (e.g., UE) with UE specific timelines for DL and UL HARQ operation (e.g., reusing legacy HARQ timelines) for the various dynamically configured LTE UL-DL configurations can remove some complexity in the implementation of the HARQ timelines and provide a simpler solution to DL and UL HARQ operation in case of dynamic UL-DL reconfiguration. To enable dynamic UL-DL reconfiguration, for advanced UEs, existing HARQ timelines can be reused by configuring two independent HARQ timelines: one HARQ timeline for UL operation 224 and one HARQ timeline for DL operation 212, as illustrated in FIG. 5. These UL-DL configurations may be independently configured for each UE in the cell, which can be overlaid on the legacy UL-DL configuration. The configuration of the UL favored and DL favored UL-DL configurations can automatically change the number of the HARQ processes that are available for operation of the advanced UEs. The number of DL HARQ processes may be defined by the DL favored UL-DL configuration, according to the specification (e.g., Table 2 (FIG. 3) for the LTE specification). The number of UL HARQ processes may be defined by UL favored UL-DL configuration, according to the specification (e.g., Table 4 for the LTE specification).

In an example, the UL HARQ timeline may be set to a same UL HARQ timeline 224 as defined by the UL-DL configuration transmitted in SIB1 for legacy UEs (i.e., the same HARQ timeline may be used for UL HARQ operation). In another example, the DL HARQ timeline may be configured by higher level signaling (e.g., RRC signaling). FIG. 5 illustrates an example of a modified HARQ timing operation along with a PUSCH transmission timing for the case of the UL-favored LTE UL-DL configuration 0 and the DL favored LTE UL-DL configuration 5. For instance, the DL configured subframes can use the DL favored UL-DL configuration for the DL channel timing, such as a PDSCH scheduling grant transmission timing 210, a PDSCH transmission timing 210, and a PDSCH HARQ feedback timing 212 (e.g., Table 2 (FIG. 3)). The UL configured subframes can use the UL favored UL-DL configuration for the UL channel timing, such as a PUSCH scheduling grant timing 220, a PUSCH transmission timing 222 (e.g., Table 3), a PUSCH HARQ feedback timing 224 (e.g., Table 4), and a PUSCH HARQ retransmission timing. For the advanced UE dynamic UL/DL configuration 206, the DL subframe 5 can use the DL channel timing 210 and 212, while the UL configured flexible subframe 3 can use the UL channel timing 220, 222, and 224. Many different combinations and variations can exist using the principles illustrated.

Figure 6:
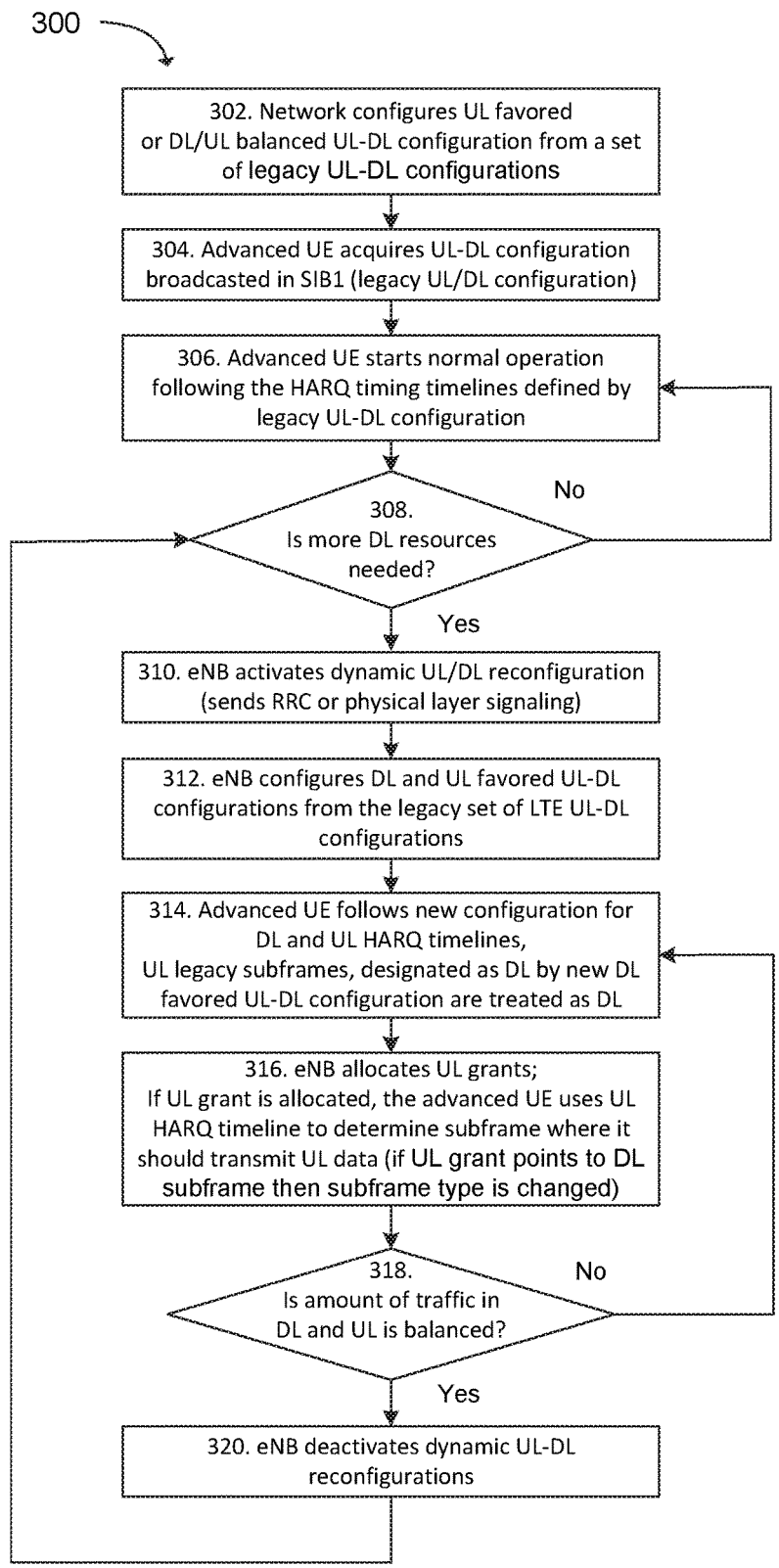
FIG. 6 depicts a flow chart of a behavioral model for a user equipment (UE) and an evolved Node B (eNB) in a long term evolution (LTE) time-division duplexing (TDD) network with dynamic uplink-downlink (UL-DL) reconfiguration in accordance with an example.

FIG. 6. illustrates an example flowchart 300 for an advanced UEs in LTE TDD networks that supports the dynamic traffic adaptation. The network (via an eNB) can configure UL favored a UL-DL configuration or a DL/UL balanced UL-DL configuration (e.g., DL favored UL-DL configuration) from a set of legacy UL-DL configurations 302. The advanced UE (e.g., LTE Release 12 UE) can acquire the UL-DL configuration broadcasted in SIB1 (i.e., a legacy UL-DL configuration) 304. The SIB 1 legacy UL-DL configuration can be a UL favored UL-DL configuration (relative to other UL-DL configurations used in the dynamic reconfiguration). The advanced UE can start a normal operation following the HARQ timing timelines defined by the legacy UL-DL configuration 306. The network can make a determination if more DL resources are needed 308. If additional DL resources are not need the advanced UE and the eNB can continue normal operation (operation 306). If additional resources are needed, the eNB can activate dynamic UL/DL reconfiguration (e.g., send a UL-DL reconfiguration indicator via RRC signaling or physical layer signaling) 310. The eNB can configure the DL and UL favored UL-DL configurations from the set of legacy LTE UL-DL configurations 312. The advanced UE can follow a new configuration for DL and UL HARQ timelines, and UL legacy subframes designated as DL by a new DL favored UL-DL configuration can be treated as potential DL subframes 314. The eNB can allocate the UL grants 316. If the UL grant is allocated, the advanced UE can use the UL HARQ timeline to determine subframe to transmit the UL data (if the UL grant points to a DL subframe then the subframe type is changed to a DL subframe). The network can make a determination if the amount of traffic in DL and UL transmission is balanced 318. If the DL and UL traffic is not balanced, the network and advanced UE can maintain the new configuration, as shown by operation 314. If the DL and UL traffic is balanced, the eNB can deactivate the dynamic UL-DL reconfigurations 320 and start over 302.

The dynamic reconfiguration technology described herein can provide various advantages and benefits to the LTE TDD systems. For example, the technology described can enable fast traffic adaptation capabilities by dynamically changing the amount of DL and UL resources. No additional physical layer signaling may be needed while still supporting a fast 10 ms adaptation time scale, which can provide improved performance benefits. The technology described can provide legacy (e.g., LTE Release 11) compatible operation with dynamic UL-DL reconfiguration for legacy and advanced (LTE Release 12 UE or terminals). The technology described can reuse existing HARQ timelines with flexible traffic adaptation capabilities. The technology described may not introduce new UL-DL configuration to the LTE system; however, the technology can be extended to support new UL-DL configurations with some minor changes (e.g., HARQ timing handling).

Figure 7:
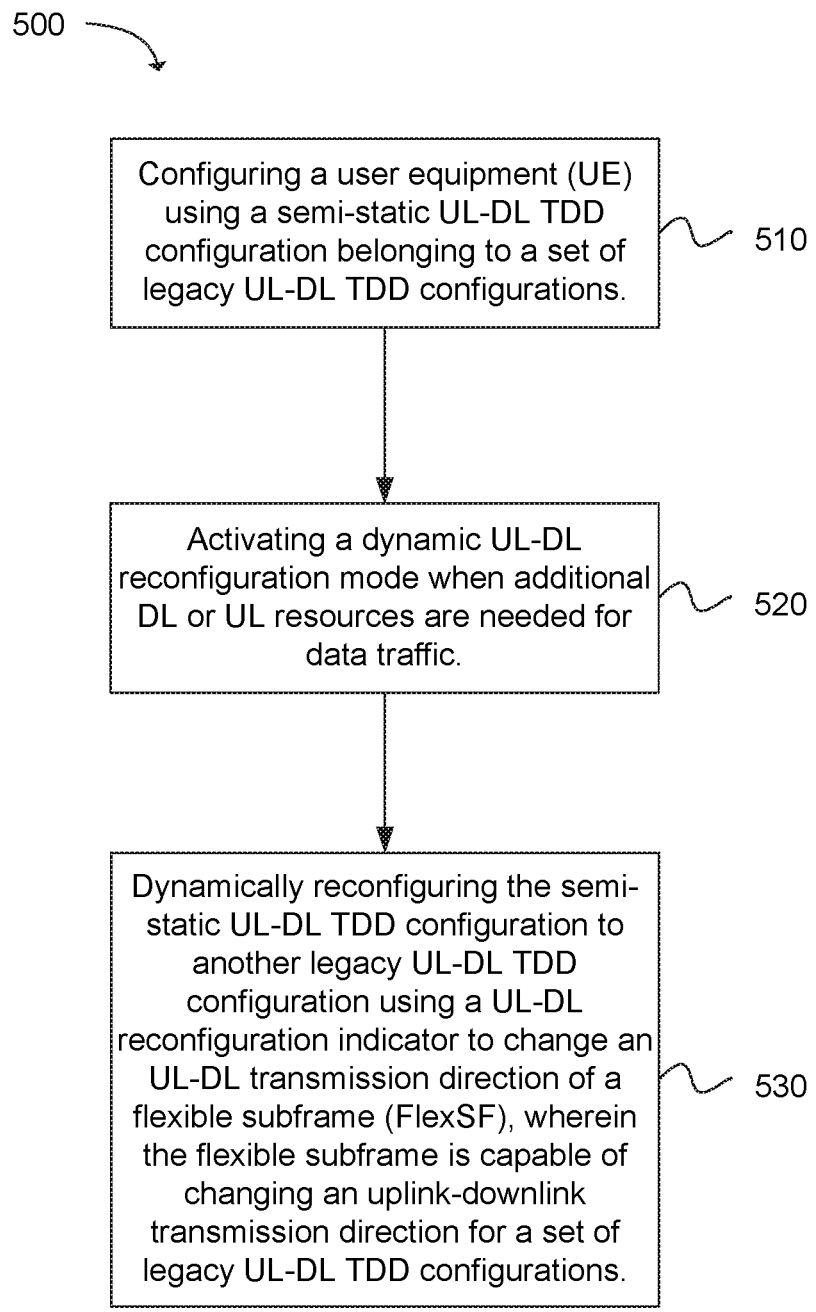
FIG. 7 depicts a flow chart of a method for dynamically reconfiguring an uplink-downlink (UL-DL) time-division duplexing (TDD) configuration by an evolved Node B (eNB) in accordance with an example.

Another example provides a method 500 for dynamically reconfiguring an uplink-downlink (UL-DL) time-division duplexing (TDD) configuration by an evolved Node B (eNB), as shown in the flow chart in FIG. 7. The method may be executed as instructions on a machine, computer circuitry, or a processor for the UE, where the instructions are included on at least one computer readable medium or one non-transitory machine readable storage medium. The method includes the operation of configuring a user equipment (UE) using a semi-static UL-DL TDD configuration belonging to a set of legacy UL-DL TDD configurations, as in block 510. The next operation of the method can be activating a dynamic UL-DL reconfiguration mode when additional DL or UL resources are needed for data traffic, as in block 520. The method can further include dynamically reconfiguring the semi-static UL-DL TDD configuration to another legacy UL-DL TDD configuration using a UL-DL reconfiguration indicator to change an UL-DL transmission direction of a flexible subframe (FlexSF), wherein the flexible subframe is capable of changing an uplink-downlink transmission direction for a set of legacy UL-DL TDD configurations, as in block 530.

In an example, the operation of dynamically reconfiguring the semi-static UL-DL TDD configuration to the other legacy UL-DL TDD configuration can further include: reconfiguring a DL channel timing based on a DL favored UL-DL configuration; reconfiguring an UL channel timing based on a UL favored UL-DL configuration; and communicating a HARQ feedback for subframes in a frame using the DL channel timing or the UL channel timing respectively. The DL favored UL-DL configuration can include more DL subframes than a semi-static UL-DL TDD configuration for the UE, and the DL channel timing can include a physical downlink shared channel (PDSCH) scheduling grant transmission timing (e.g., 210 in FIG. 5), a PDSCH transmission timing (e.g., 210 in FIG. 5), and a PDSCH hybrid automatic repeat request (HARQ) feedback timing (e.g., 212 in FIG. 5; Table 2 (FIG. 3)). The UL favored UL-DL configuration can include more UL subframes than a semi-static UL-DL TDD configuration for the UE or is identical to the semi-static UL-DL TDD configuration broadcasted by the SIB1, and the UL channel timing can include a physical uplink shared channel (PUSCH) scheduling grant timing (e.g., 220 in FIG. 5), a PUSCH transmission timing (e.g., 222 in FIG. 5; Table 3), a PUSCH HARQ feedback timing (e.g., 224 in FIG. 5; Table 4), and a PUSCH HARQ retransmission timing.

In another example, a third generation partnership project (3GPP) long term evolution (LTE) UL-DL configuration 0 provides the UL favored UL-DL configuration for UL-DL configurations 6, 1, 3, 2, 4, and 5. An LTE UL-DL configuration 1 provides the DL favored UL-DL configuration for UL-DL configurations 6 and 0 and the UL favored UL-DL configuration for UL-DL configurations 3, 2, 4, and 5. An LTE UL-DL configuration 2 provides the DL favored UL-DL configuration for UL-DL configurations 3, 1, 6, and 0 and the UL favored UL-DL configuration for UL-DL configuration 5. An LTE UL-DL configuration 3 provides the DL favored UL-DL configuration for UL-DL configurations 1, 6, and 0 and the UL favored UL-DL configuration for UL-DL configuration 2, 4, and 5. An LTE UL-DL configuration 4 provides the DL favored UL-DL configuration for UL-DL configurations 3, 1, 6, and 0 and the UL favored UL-DL configuration for UL-DL configuration 5. An LTE UL-DL configuration 5 provides the DL favored UL-DL configuration for UL-DL configurations 4, 2, 3, 1, 6, and 0. An LTE UL-DL configuration 6 provides the DL favored UL-DL configuration for UL-DL configuration 0 and the UL favored UL-DL configuration for UL-DL configuration 1, 3, 2, 4, and 5.

In another configuration, the operation of configuring the UE using the semi-static UL-DL TDD configuration can further include broadcasting the semi-static UL-DL TDD configuration to the UE via a system information block type 1 (SIB1). In another example, the UL-DL reconfiguration indicator can be indicated using a DL downlink control information (DCI) grant or an UL DCI grant in a DCI grant subframe. The DL DCI grant or the UL DCI grant can provide a grant for the FlexSF.

In another configuration, the method can further include deactivating the dynamic UL-DL reconfiguration mode when the semi-static UL-DL TDD configuration is balanced for the data traffic. In another example, the operation of activating the dynamic UL-DL reconfiguration mode can further include: transmitting a dynamic UL-DL reconfiguration mode activation indicator to the UE to activate a dynamic UL-DL reconfiguration mode, and receiving an acknowledgement (ACK) from the UE indicating that the UE is in the dynamic UL-DL reconfiguration mode. The dynamic UL-DL reconfiguration mode activation indicator can be transmitted via a DCI or radio resource control (RRC) signaling. The operation of deactivating the dynamic UL-DL reconfiguration mode can further include: transmitting a dynamic UL-DL reconfiguration mode deactivation indicator to the UE to deactivate the dynamic UL-DL reconfiguration mode; and receiving an acknowledgement (ACK) from the UE indicating the deactivation of the dynamic UL-DL reconfiguration mode by the UE. The deactivation indicator can be transmitted via a DCI or radio resource control (RRC) signaling. The FlexSF can include subframes 3, 4, 7, 8, or 9 configured as UL or DL subframes by the semi-static UL-DL TDD configuration.

In another configuration, the operation of dynamically reconfiguring the semi-static UL-DL TDD configuration to the other legacy UL-DL TDD configuration can occur within a duration of approximately one radio frame or approximately 10 milliseconds (ms). The legacy UL-DL TDD configuration can include third generation partnership project (3GPP) long term evolution (LTE) UL-DL configurations 0-6. A physical downlink control channel (PDCCH) or an enhanced PDCCH (EPDCCH) can transmit a DL DCI grant.

Figure 8:
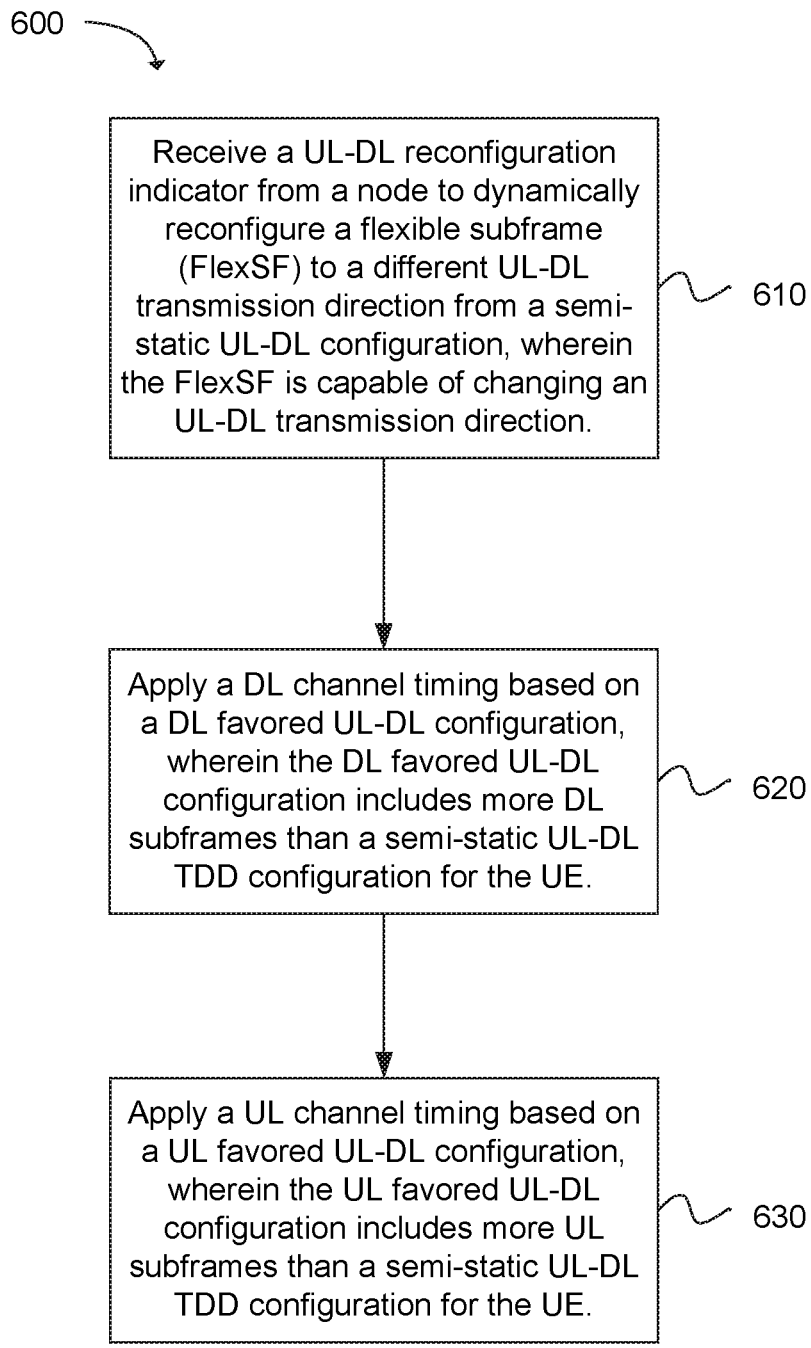
FIG. 8 depicts functionality of computer circuitry of a user equipment (UE) operable for dynamically reconfiguring an uplink-downlink (UL-DL) time-division duplexing (TDD) configuration in accordance with an example.

Another example provides functionality 600 of computer circuitry on a user equipment (UE) operable for dynamically reconfiguring an uplink-downlink (UL-DL) time-division duplexing (TDD) configuration, as shown in the flow chart in FIG. 8. The functionality may be implemented as a method or the functionality may be executed as instructions on a machine, where the instructions are included on at least one computer readable medium or one non-transitory machine readable storage medium. The computer circuitry can be receive a UL-DL reconfiguration indicator from a node to dynamically reconfigure a flexible subframe (FlexSF) to a different UL-DL transmission direction from a semi-static UL-DL configuration, wherein the FlexSF is capable of changing an UL-DL transmission direction, as in block 610. The computer circuitry can be further configured to apply a DL channel timing based on a DL favored UL-DL configuration, wherein the DL favored UL-DL configuration includes more DL subframes than a semi-static UL-DL TDD configuration for the UE, as in block 620. The computer circuitry can also be configured to apply a UL channel timing based on a UL favored UL-DL configuration, wherein the UL favored UL-DL configuration includes more UL subframes than a semi-static UL-DL TDD configuration for the UE, as in block 630. In another example, the computer circuitry can also be configured to apply a UL channel timing based on a UL favored UL-DL configuration, wherein the UL favored UL-DL configuration includes more UL subframes than a semi-static UL-DL TDD configuration for the UE or is identical to semi-static UL-DL TDD configuration broadcasted by the SIB1.

In an example, the computer circuitry can be further configured to communicate a HARQ feedback for subframes in a frame using the DL channel timing or the UL channel timing. The DL channel timing can include a physical downlink shared channel (PDSCH) scheduling grant transmission timing (e.g., a grant can be a DCI carried by the PDCCH or EPDCCH), a PDSCH transmission timing (e.g., can be a same subframe as the PDSCH scheduling grant), or a PDSCH hybrid automatic repeat request (HARQ) feedback timing (e.g., can be carried in the PUCCH or PUSCH) for subframes of a frame when the FlexSF is configured as a DL subframe. The UL channel timing can include a physical uplink shared channel (PUSCH) scheduling grant timing (e.g., a grant can be a DCI carried by the PDCCH or EPDCCH), a PUSCH transmission timing, a PUSCH HARQ feedback timing (e.g., can be carried by a physical hybrid ARQ indicator channel (PHICH)), or a PUSCH HARQ retransmission timing for the subframes of the frame when the FlexSF is configured as a UL subframe.

In another example, the computer circuitry can be further configured to: configure the DL favored UL-DL configuration via radio resource control (RRC) signaling; and configure the UL favored UL-DL configuration via radio resource control (RRC) signaling, or set the UL favored UL-DL configuration to a legacy UL-DL TDD configuration transmitted in a system information block type 1 (SIB1). In another configuration, the computer circuitry can be further configured to: monitor a downlink control information (DCI) grant subframe for a DL DCI grant or an UL DCI grant which provides a grant for the FlexSF; configure the FlexSF as the UL subframe when the DCI grant subframe includes the UL DCI grant for the FlexSF; and configure the FlexSF as the DL subframe when the DCI grant subframe includes the DL DCI grant for the FlexSF. The UL-DL reconfiguration indicator can be indicated by the grant. The DCI grant subframe with the DL DCI grant comprises the FlexSF and a physical downlink shared channel (PDSCH) is received in the FlexSF. The DCI grant subframe with the UL DCI grant comprises a DL subframe that precedes the FlexSF, and a physical uplink shared channel (PUSCH) is sent in the FlexSF. A physical downlink control channel (PDCCH) or an enhanced PDCCH (EPDCCH) can be transmitted in the DCI grant subframe.

In another example, a third generation partnership project (3GPP) long term evolution (LTE) UL-DL configuration 0 provides the UL favored UL-DL configuration for UL-DL configurations 6, 1, 3, 2, 4, and 5. An LTE UL-DL configuration 1 provides the DL favored UL-DL configuration for UL-DL configurations 6 and 0 and the UL favored UL-DL configuration for UL-DL configurations 3, 2, 4, and 5. An LTE UL-DL configuration 2 provides the DL favored UL-DL configuration for UL-DL configurations 3, 1, 6, and 0 and the UL favored UL-DL configuration for UL-DL configuration 5. An LTE UL-DL configuration 3 provides the DL favored UL-DL configuration for UL-DL configurations 1, 6, and 0 and the UL favored UL-DL configuration for UL-DL configuration 2, 4, and 5. An LTE UL-DL configuration 4 provides the DL favored UL-DL configuration for UL-DL configurations 3, 1, 6, and 0 and the UL favored UL-DL configuration for UL-DL configuration 5. An LTE UL-DL configuration 5 provides the DL favored UL-DL configuration for UL-DL configurations 4, 2, 3, 1, 6, and 0. An LTE UL-DL configuration 6 provides the DL favored UL-DL configuration for UL-DL configuration 0 and the UL favored UL-DL configuration for UL-DL configuration 1, 3, 2, 4, and 5.

In another configuration, the computer circuitry can be further configured to: receive a dynamic UL-DL reconfiguration mode activation indicator from a node to activate a dynamic UL-DL reconfiguration; activate the dynamic UL-DL reconfiguration mode; and transmit an acknowledgement (ACK) of the dynamic UL-DL reconfiguration mode. The dynamic UL-DL reconfiguration mode activation indicator can be received via a DCI or radio resource control (RRC) signaling. The computer circuitry can be further configured to: receive a dynamic UL-DL reconfiguration mode deactivation indicator from a node; deactivate the dynamic UL-DL reconfiguration mode; and transmit an acknowledgement (ACK) of the deactivation of the dynamic UL-DL reconfiguration mode. The deactivation indicator can be received via a DCI or radio resource control (RRC) signaling.

In another example, the computer circuitry can be further configured to receive a semi-static UL-DL TDD configuration belonging to a set of legacy UL-DL TDD configurations via a system information block type 1 (SIB1) prior to receiving the UL-DL reconfiguration indicator. The computer circuitry can dynamically reconfigure the UL-DL TDD configuration to another legacy UL-DL TDD configuration within a duration of approximately one radio frame or approximately 10 milliseconds (ms). The legacy UL-DL TDD configuration can include third generation partnership project (3GPP) long term evolution (LTE) UL-DL configurations 0-6. The FlexSF can include subframes 3, 4, 7, 8, or 9.

In another configuration, the computer circuitry can be further configured to: convert a frame of a semi-static UL-DL TDD configuration to another legacy UL-DL TDD configuration based on the received UL-DL reconfiguration indicator; reconfigure a DL channel timing based on the DL favored UL-DL TDD configuration; and reconfigure a UL channel timing based on the UL favored UL-DL TDD configuration. The DL channel timing can include a physical downlink shared channel (PDSCH) scheduling grant transmission timing, a PDSCH transmission timing, or a PDSCH hybrid automatic repeat request (HARQ) feedback timing. The UL channel timing can include a physical uplink shared channel (PUSCH) scheduling grant timing, a PUSCH transmission timing, a PUSCH HARQ feedback timing, or a PUSCH HARQ retransmission timing.

Figure 9:
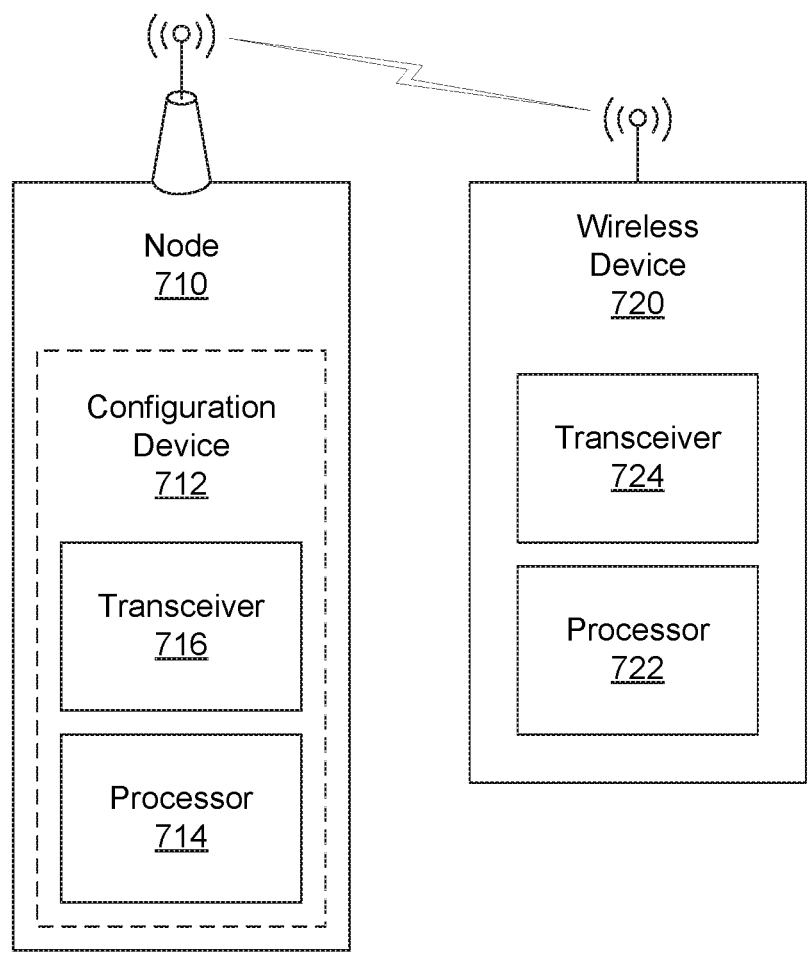
FIG. 9 illustrates a block diagram of a node (e.g., eNB) and wireless device (e.g., UE) in accordance with an example.

FIG. 9 illustrates an example node 710 (e.g., eNB) and an example wireless device 720 (e.g., UE). The node can be configured for dynamically reconfiguring an uplink-downlink (UL-DL) time-division duplexing (TDD) configuration, as described in 500 of FIG. 7. Referring back to FIG. 9, the node can include a configuration device 712. The configuration device or the node can be configured to communicate with the wireless device. The configuration device can be configured to dynamically reconfigure an uplink-downlink (UL-DL) time-division duplexing (TDD) configuration. The configuration device can include a processor 714 and a transceiver 716. The processor can be configured to dynamically reconfigure a semi-static UL-DL TDD configuration to another legacy UL-DL TDD configuration using a DL DCI grant or an UL DCI grant in a downlink control information (DCI) grant subframe. The DL DCI grant or the UL DCI grant can provide a grant for a flexible subframe (FlexSF). The flexible subframe can be capable of changing an uplink-downlink transmission direction for a set of legacy UL-DL TDD configurations. The transceiver can be configured to transmit the DL DCI grant or the UL DCI grant to a user equipment (UE) in the DCI grant subframe.

In another configuration, the processor 714 can be further configured to: apply a DL channel timing based on a DL favored UL-DL configuration; and apply an UL channel timing based on a UL favored UL-DL configuration. The DL favored UL-DL configuration can include more DL subframes than a semi-static UL-DL TDD configuration for the UE, and the DL channel timing can include a physical downlink shared channel (PDSCH) scheduling grant transmission timing, a PDSCH transmission timing, and a PDSCH hybrid automatic repeat request (HARQ) feedback timing. The UL favored UL-DL configuration can include more UL subframes than a semi-static UL-DL TDD configuration for the UE, and the UL channel timing can include a physical uplink shared channel (PUSCH) scheduling grant timing, a PUSCH transmission timing, a PUSCH HARQ feedback timing, and a PUSCH HARQ retransmission timing. The transceiver 716 can be further configured to communicate a HARQ feedback for subframes in a frame using the DL channel timing or the UL channel timing.

In another example, the processor 714 can be further operable to: activate a dynamic UL-DL reconfiguration mode when additional DL resources are needed for data traffic; and deactivate the dynamic UL-DL reconfiguration mode when the semi-static UL-DL TDD configuration is balanced for the data traffic. The transceiver 716 can be further configured to: transmit a dynamic UL-DL reconfiguration mode activation indicator to the UE to activate a dynamic UL-DL reconfiguration mode, where the activation indicator can be transmitted via a DCI or radio resource control (RRC) signaling; receive an acknowledgement (ACK) from the UE indicating that the UE activated the dynamic UL-DL reconfiguration mode; transmit a dynamic UL-DL reconfiguration mode deactivation indicator to the UE to deactivate the dynamic UL-DL reconfiguration mode, where the deactivation indicator can be transmitted via a DCI or radio resource control (RRC) signaling; and receive an acknowledgement (ACK) from the UE indicating the deactivation of the dynamic UL-DL reconfiguration mode by the UE.

The processor 714 can dynamically reconfigure the semi-static UL-DL TDD configuration to the other legacy UL-DL TDD configuration within a duration of approximately one radio frame or approximately 10 milliseconds (ms). The legacy UL-DL TDD configuration can include third generation partnership project (3GPP) long term evolution (LTE) UL-DL configurations 0-6. The FlexSF can include subframes 3, 4, 7, 8, or 9. A physical downlink control channel (PDCCH) or an enhanced PDCCH (EPDCCH) can be transmitted in the DCI grant subframe. The DCI grant subframe with the DL DCI grant can include the FlexSF and a physical downlink shared channel (PDSCH) can be received in the FlexSF; and the DCI grant subframe with the UL DCI grant can include a DL subframe that precedes the FlexSF, and a physical uplink shared channel (PUSCH) can be sent in the FlexSF.

The node 710 can include a base station (BS), a Node B (NB), an evolved Node B (eNB), a baseband unit (BBU), a remote radio head (RRH), a remote radio equipment (RRE), a remote radio unit (RRU), a central processing module (CPM).

The wireless device 720 can include a transceiver 724 and a processor 722. The wireless device can be configured for dynamically reconfiguring an uplink-downlink (UL-DL) time-division duplexing (TDD) configuration, as described in 600 of FIG. 8.

Figure 10:
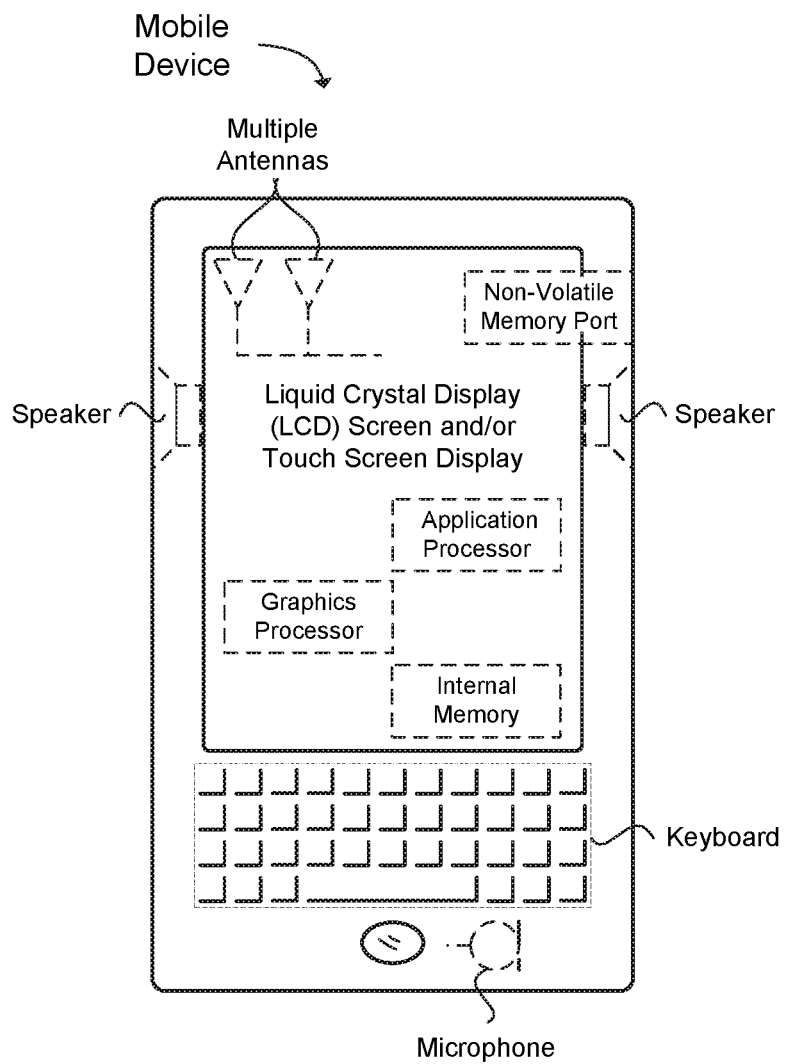
FIG. 10 illustrates a diagram of a wireless device (e.g., UE) in accordance with an example.

FIG. 10 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or transmission station, such as a base station (BS), an evolved Node B (eNB), a baseband unit (BBU), a remote radio head (RRH), a remote radio equipment (RRE), a relay station (RS), a radio equipment (RE), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 10 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An apparatus of a user equipment (UE) configured to perform adaptive time division duplexing (TDD) hybrid automatic repeat request (HARQ)-ACKnowledgement (ACK) reporting, the apparatus comprising one or more processors and memory configured to:
   implement, at the UE, an adaptive uplink-downlink (UL-DL) configuration received from an eNodeB;
   process, at the UE, a downlink (DL) HARQ reference configuration received from the eNodeB for a serving cell, wherein the DL HARQ reference configuration received from the eNodeB is to be used in conjunction with the implemented adaptive UL-DL configuration at the UE; and
   format, at the UE, HARQ-ACK feedback for transmission on a physical uplink control channel (PUCCH) or physical uplink shared channel (PUSCH) of the serving cell in accordance with the DL HARQ reference configuration.

2. The apparatus of claim 1, further configured to perform uplink scheduling and HARQ feedback based on a reference UL-DL configuration received from the eNodeB via a system information block (SIB).

3. The apparatus of claim 1, wherein the DL HARQ reference configuration is received at the UE from the eNodeB via higher layer signaling.

4. The apparatus of claim 1, wherein the DL HARQ reference configuration is received at the UE via dedicated signaling from the eNodeB.

5. The apparatus of claim 1, wherein the UE is configured to support adaptive UL-DL configurations based on traffic conditions.

6. The apparatus of claim 1, wherein the UE includes an antenna, a touch sensitive display screen, a speaker, a microphone, a graphics processor, an application processor, an internal memory, or a non-volatile memory port.

7. At least one non-transitory machine readable storage medium having instructions embodied thereon for performing hybrid automatic repeat request (HARQ)-ACKnowledgment (ACK) operations at a user equipment (UE), the instructions when executed perform the following:
   activating, using one or more processors of the UE, an adaptive uplink-downlink (UL-DL) configuration;
   identifying, using the one or more processors of the UE, a downlink (DL) HARQ reference configuration for a serving cell, wherein the DL HARQ reference configuration is received at the UE for usage in conjunction with the adaptive UL-DL configuration that is activated at the UE; and
   reporting, using the one or more processors of the UE, adaptive time division duplexing (TDD) HARQ-ACK feedback for the serving cell to a network node in accordance with the DL HARQ reference configuration.

8. The at least one non-transitory machine readable storage medium of claim 7, further comprising instructions when executed perform the following: processing, at the UE, the DL HARQ reference configuration received from the network node.

9. The at least one non-transitory machine readable storage medium of claim 7, further comprising instructions when executed perform the following: performing uplink scheduling and HARQ feedback based on a reference UL-DL configuration received from the network node via a system information block (SIB).

10. The at least one non-transitory machine readable storage medium of claim 7, wherein the DL HARQ reference configuration is received from the network node via higher layer signaling.

11. The at least one non-transitory machine readable storage medium of claim 7, wherein the UE is configured to support adaptive UL-DL configurations based on traffic conditions.

12. The at least one non-transitory machine readable storage medium of claim 7, wherein the UE includes an antenna, a touch sensitive display screen, a speaker, a microphone, a graphics processor, an application processor, an internal memory, or a non-volatile memory port.

13. An apparatus of an eNodeB operable to configure hybrid automatic repeat request (HARQ) reference configurations for a user equipment (UE), the apparatus comprising one or more processors and memory configured to:
  configure, by the eNodeB, an adaptive uplink-downlink (UL-DL) configuration for the UE;
  configure, by the eNodeB, a downlink (DL) HARQ reference configuration for a serving cell at the UE, wherein the DL HARQ reference configuration corresponds to the adaptive UL-DL configuration, and the DL HARQ reference configuration is to be used in conjunction with the adaptive UL-DL configuration utilized by the UE; and
  process, at the eNodeB, HARQ-ACKnowledgement (ACK) feedback received from the UE in accordance with the DL HARQ reference configuration.

14. The apparatus of claim 13, wherein time division duplexing (TDD) HARQ-ACK feedback is received from the UE in accordance with the DL HARQ reference configuration.

15. The apparatus of claim 13, wherein the DL HARQ reference configuration is transmitted to the UE via dedicated signaling.

16. At least one non-transitory machine readable storage medium having instructions embodied thereon for configuring hybrid automatic repeat request (HARQ)-ACKnowledgment (ACK) operations for a user equipment (UE) at a network node, the instructions when executed perform the following:
  identifying, using one or more processors of the network node, a downlink (DL) HARQ reference configuration for a serving cell, wherein the DL HARQ reference configuration is to be used in conjunction with an adaptive UL-DL configuration implemented at the UE; and
  processing, using the one or more processors of the network node, the DL HARQ reference configuration for transmission to the UE, wherein the UE is configured to perform HARQ-ACKnowledgement (ACK) operations via a physical uplink control channel (PUCCH) or physical uplink shared channel (PUSCH) of the serving cell based on the DL HARQ reference configuration when the adaptive UL-DL configuration is implemented at the UE.

17. The at least one non-transitory machine readable storage medium of claim 16, wherein the HARQ-ACK operations performed at the UE are time division duplexing (TDD) HARQ-ACK operations.

18. The at least one non-transitory machine readable storage medium of claim 16, wherein the DL HARQ reference configuration is transmitted to the UE via higher layer signaling.

19. The at least one non-transitory machine readable storage medium of claim 16, wherein the UE is configured to implement adaptive UL-DL configurations based on traffic conditions.

20. The at least one non-transitory machine readable storage medium of claim 16, wherein the network node includes a base station (BS), a Node B (NB), an evolved Node B (eNB), a baseband unit (BBU), a remote radio head (RRH), a remote radio equipment (RRE), a remote radio unit (RRU), or a central processing module (CPM).

* * * * *

UNITED STATES PATENT AND TRADEMARK OFFICE
CERTIFICATE OF CORRECTION

PATENT NO. : 9,860,912 B2  
APPLICATION NO. : 15/013520  
DATED : January 2, 2018  
INVENTOR(S) : Alexey Khoryaev et al.

Page 1 of 1

It is certified that error appears in the above-identified patent and that said Letters Patent is hereby corrected as shown below:

On the Title Page

Related U.S. Application Data section should read:  
Related U.S. Application Data  
(63) Continuation of application No. 14/125,605, filed as application No. PCT/US2013/063793 on Oct. 8, 2013, now Pat. No. 9,282,571.

Signed and Sealed this  
First Day of January, 2019

Andrei Iancu  
*Director of the United States Patent and Trademark Office*